(12) United States Patent
Smaini et al.

(10) Patent No.: US 10,827,431 B2
(45) Date of Patent: Nov. 3, 2020

(54) RECEIVER FRONT-END POWER CONSUMPTION REDUCTION VIA LINEARITY AND SENSITIVITY ADAPTATION

(71) Applicant: Apple Inc., Cupertino, CA (US)

(72) Inventors: Lydi Smaini, San Jose, CA (US); Tarik Tabet, Los Gatos, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 15/274,933

(22) Filed: Sep. 23, 2016

(65) Prior Publication Data

US 2017/0195964 A1    Jul. 6, 2017

Related U.S. Application Data

(60) Provisional application No. 62/275,745, filed on Jan. 6, 2016.

(51) Int. Cl.
*H04W 52/02* (2009.01)

(52) U.S. Cl.
CPC ... *H04W 52/0235* (2013.01); *H04W 52/0238* (2013.01); *H04W 52/0241* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01);

(Continued)

(58) Field of Classification Search
None
See application file for complete search history.

(56) References Cited

U.S. PATENT DOCUMENTS

| 8,874,065 B2 | 10/2014 | Pan et al. | |
| 2006/0281486 A1* | 12/2006 | Ngai | H04W 52/0245 455/552.1 |

(Continued)

OTHER PUBLICATIONS

Fowler, Scott; "Study on Power Saving Based on Radio Frame in LTE Wireless Communication System Using DRX"; IEEE Globecom Workshop on Workshop of SCPA and SaCoNAS; Dec. 5-9, 2011; 6 pages.

*Primary Examiner* — Scott M Sciacca
(74) *Attorney, Agent, or Firm* — Kowert, Hood, Munyon, Rankin & Goetzel, P.C.

(57) ABSTRACT

A wireless communication device may operate in different power modes based at least on a decoding of a Physical Data Control Channel (PDCCH). The wireless communication device may operate its receiver front end circuitry (RX AFE) in any one of a number of different power modes, and may switch to operating the RX AFE in a different power mode based at least on decoding of the PDCCH. The transmit leakage does not need to be monitored, and the wireless communication device may adjust/adapt the sensitivity and linearity of its RX AFE based on PDCCH decoding and in some cases based additionally on one or more metrics, to reduce power consumption. The different power modes may correspond to different respective combinations of sensitivity level and linearity level at which the RX AFE is operating.

20 Claims, 17 Drawing Sheets

(52) U.S. Cl.
CPC .......... *Y02D 70/164* (2018.01); *Y02D 70/168* (2018.01); *Y02D 70/24* (2018.01); *Y02D 70/26* (2018.01)

(56) References Cited

U.S. PATENT DOCUMENTS

| | | | |
|---|---|---|---|
| 2011/0021168 A1* | 1/2011 | Weissman | H03G 3/3052 455/234.1 |
| 2012/0120860 A1 | 5/2012 | Chui et al. | |
| 2012/0231729 A1* | 9/2012 | Xu et al. | G01S 19/21 455/13.4 |
| 2014/0185501 A1* | 7/2014 | Park | H04W 52/0238 370/311 |
| 2015/0333781 A1 | 11/2015 | Alon et al. | |
| 2015/0346807 A1* | 12/2015 | Homchaudhuri | G06F 1/3293 713/323 |
| 2015/0358910 A1* | 12/2015 | Tillman et al. | H04W 52/0245 370/311 |
| 2016/0132091 A1* | 5/2016 | Bodner et al. | G06F 1/3206 713/323 |
| 2016/0198417 A1* | 7/2016 | Park et al. | H04W 52/287 370/311 |

* cited by examiner

RECEIVER FRONT-END POWER CONSUMPTION REDUCTION VIA LINEARITY AND SENSITIVITY ADAPTATION

PRIORITY CLAIM

This application claims benefit of priority of U.S. Provisional Patent Application Ser. No. 62/275,745 titled "Receiver Front-End Power Consumption Reduction via Linearity and Sensitivity Adaptation", filed on Jan. 6, 2016, which is hereby incorporated by reference in its entirety as though fully and completely set forth herein.

FIELD OF THE INVENTION

The present application relates to wireless communications, and more particularly to receiver front-end power reduction in wireless communication devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

The power consumption of an RF (radio frequency) transceiver—included in UE devices, base stations and relay stations, for example—is typically a function of the signal fidelity presented at the input of an ADC present in the receive (RX) path. The receiver is typically designed to optimize the noise figure (requiring more power) at sensitivity levels, in which case linearity is not important. At high signal levels, the receiver is typically operated to optimize the linearity (requiring more power), in which case the noise figure can be relaxed. However, in a worst-case scenario, the two design requirements (noise figure and linearity) are expected to be handled simultaneously. This is the case in FDD (frequency division duplex) transceivers where a small signal (close to sensitivity) is received in the presence of two signal blockers. In LTE (Long Term Evolution) systems, the first blocker is transmit (TX) leakage and the second blocker can be a continuous wave (CW) blocker or a modulated interferer. These scenarios can impose strict linearity requirements at a low noise amplifier (LNA) present in the RX path, and especially at the mixer present in the RX path, since due to the small signal, the LNA is expected to provide sufficient gain to keep the degradation of the RX signal to a minimum. In other words, in LTE, FDD mode imposes severe constraints on the receiver linearity due to TX signal leakage in the receiver path requiring very high dynamic range and then high power consumption. As a result, RX front-end circuits are generally over-specified for worst case and designed to decode higher-order modulation (requiring high SNR) in the presence of TX leakage. Accordingly, improvements in the field are desirable.

SUMMARY OF THE INVENTION

Embodiments are presented herein of, inter alia, of methods for reducing receiver front-end power consumption in wireless communication devices, and of devices that implement the methods. Embodiments are further presented herein for wireless communication systems containing wireless communication devices or user equipment (UE) devices and base stations communicating with each other within the wireless communication systems.

In various embodiments, a UE device may operate in one of a number of different power modes, with each respective power mode corresponding to a different combination of operating characteristics of a receiver (RX) front end circuitry of the UE device. For example, each respective power mode may correspond to a different combination of sensitivity level and linearity level of operation of the receiver front end circuitry of the UE device. The UE device may switch from operating in a one (present) power mode to operating in another (next) power mode, based at least on a decoding of a physical control channel, for example a physical downlink control channel (PDCCH) by the UE device. In some embodiments, the UE device may switch from operating in the present power mode to operating in the next power mode based additionally on one or more metrics. The different power modes may include at least two of the following:

a first low-power mode corresponding to the RX front end circuitry operating at high sensitivity and low linearity;

a second low-power mode, also referred to as a lower-power mode corresponding to the RX front end circuitry operating at low sensitivity and low linearity;

a high-performance mode corresponding to the RX front end circuitry operating at high sensitivity and high linearity; and/or an ultra-low-power mode corresponding to the RX front end circuitry being turned off.

Furthermore, the one or more metrics may include a time duration for which no grant signal has been received by the UE device in downlink communications, signal-to-interference-plus-noise ratio (SINR) at the UE device, type of applications running on the UE device, and/or data rate of data received by the UE device. The UE may switch from operating in the present power mode to operating in the next power mode by adjusting a current conducted by the RX front end circuitry of the UE device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
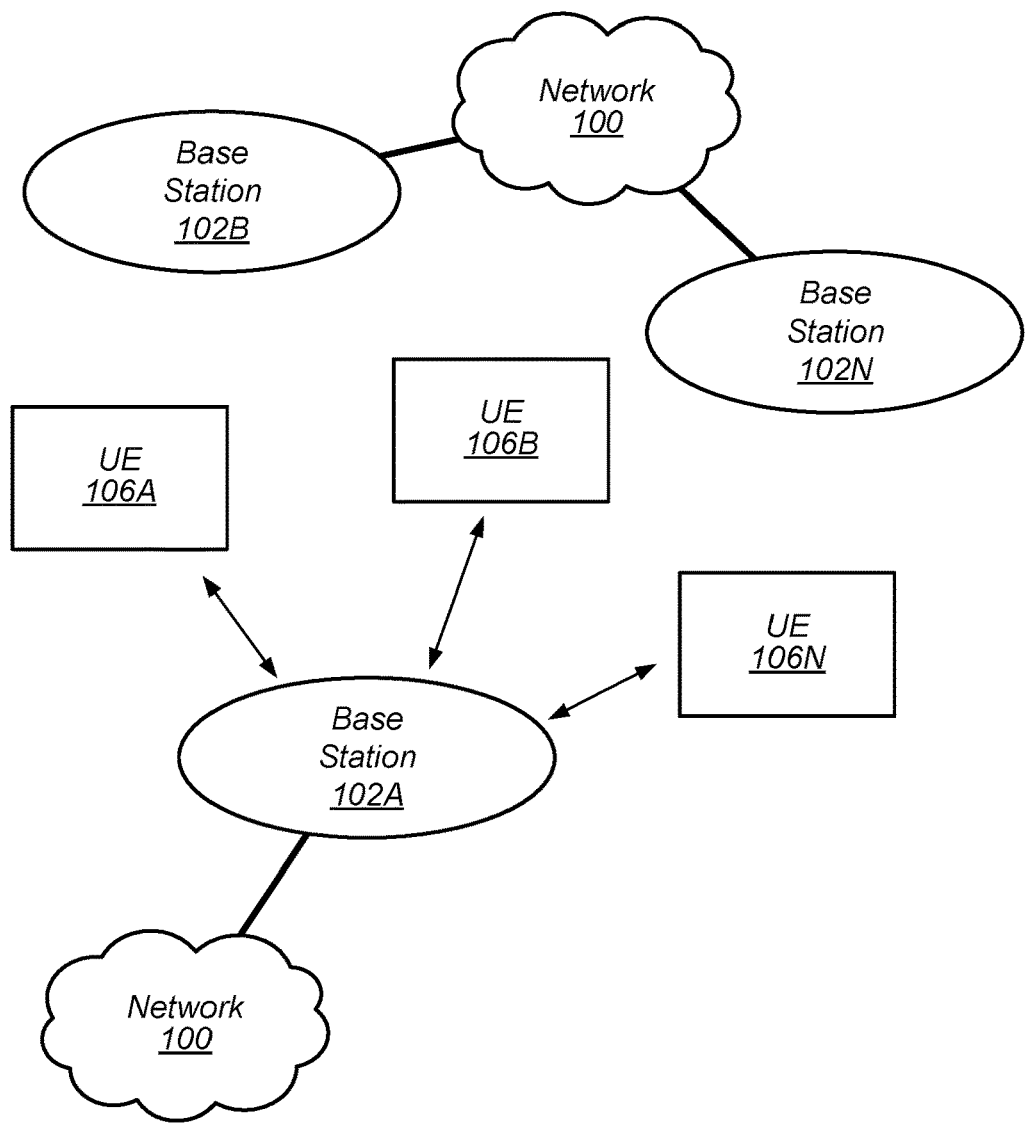
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission/Transmit
RX: Reception/Receive
UMTS: Universal Mobile Telecommunication System
LAN: Local Area Network
WLAN: Wireless LAN
AP: Access Point
APR: Applications Processor
APN: Access Point Name
GPRS: General Packet Radio Service
GTP: GPRS Tunneling Protocol
PDN: Packet Data Network
PGW: PDN Gateway
SGW: Serving Gateway
RAT: Radio Access Technology
Wi-Fi: Wireless Local Area Network (WLAN) RAT based on the Institute of Electrical and Electronics Engineers' (IEEE) 802.11 standards
PDCP: Packet Data Convergence Protocol
BSR: Buffer Size Report
CMR: Change Mode Request
TBS: Transport Block Size
ROHC: Robust Header Compression
SID: System Identification Number
PDU: Protocol Data Unit
PT: Payload Type
FT: Frame Type
AMR-WB: Adaptive Multi-Rate Wideband
RTP: Real-time Transport Protocol
IR: Initialization and Refresh state
FO: First-Order state
DYN: Dynamic Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which may be mobile or portable and which perform wireless communications. Such devices are also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™ PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) capable of wireless communication, and which may be stationary or may be easily transported by a user.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
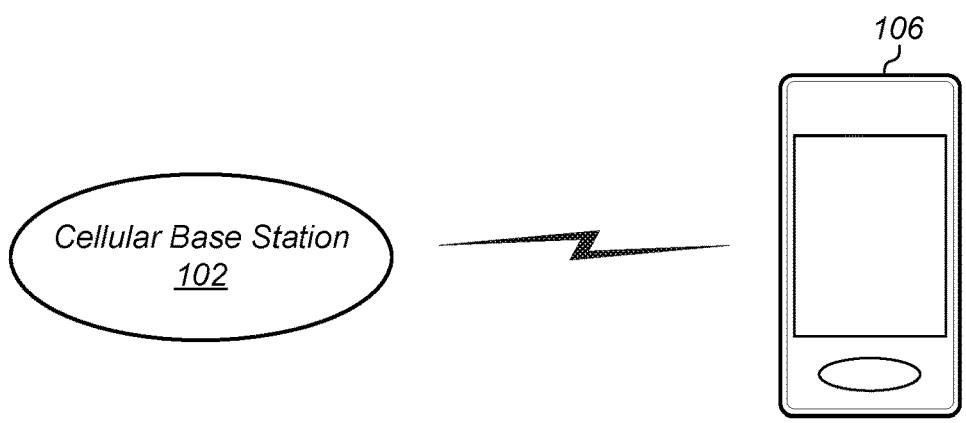
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate in a number of power modes, and may switch from operating in one power mode to operating in a different power mode as detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to operate with reduced power consumption at the receiver front-end by operating in one of a number of different power modes at a time, switching between different power modes of operation at least according to the various methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications.

Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
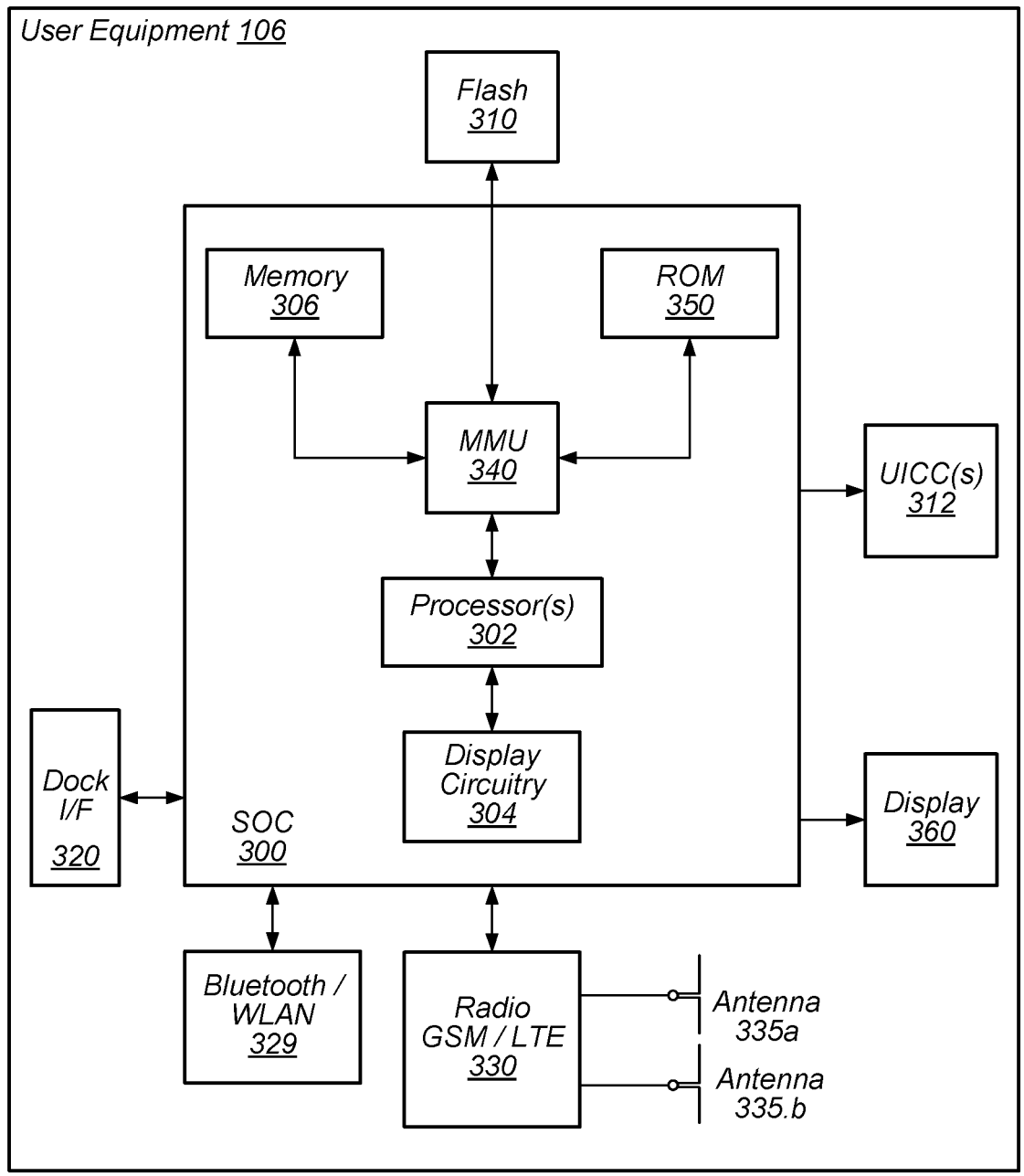
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for UE 106 [and base station 102] communicating [with each other] with at least reduced receiver front-end power consumption in UE 106. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate reduced receiver front-end power consumption—via linearity and sensitivity adaptation—by UE 106 according to various embodiments disclosed herein. Specifically, processor(s) 302 may be coupled to and/or may interoperate with other components as shown in FIG. 3 to facilitate UE 106 communicating in a manner that seeks to optimize power consumption and performance during wireless communications of UE 106, for example by operating in one of a number of different power modes and switching from operating in one power mode to operating in another power mode based on a variety of factors. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. LTE controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302) as will be further described below. For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
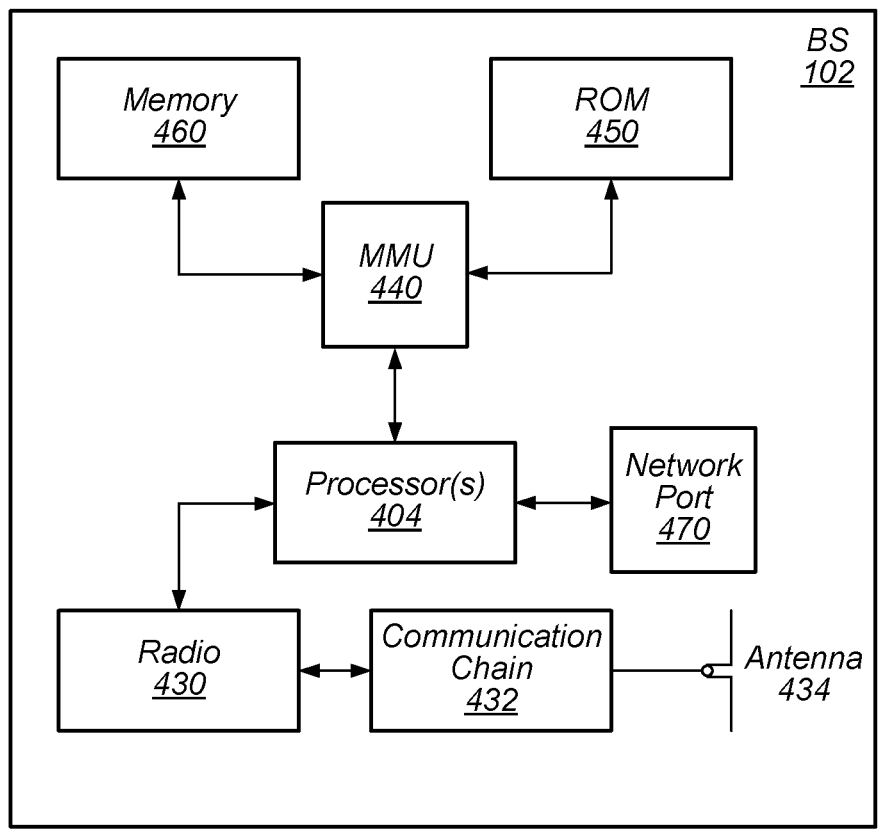
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein for base station 102 to communicate with a UE device capable of adaptively reducing power consumption in its receiver front-end via linearity and sensitivity adaptation during wireless communications, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of receiver front-end power consumption reduction via linearity and sensitivity adaptation.

Power Consumption and Efficient Operation

In LTE, FDD (Frequency Division Duplex) mode imposes severe constraints on the receiver linearity due to transmit (TX) signal leakage in the receiver path requiring very high dynamic range and also high power consumption. As a result, receiver (RX) front-ends or RX front-end circuits are generally over-specified for worst case, and designed to decode higher-order modulation (requiring high signal-to-noise ratio—SNR) in presence of TX leakage. However, TX leakage is not always present, especially during certain operations performed by the UE, specifically during initial acquisition, synchronization and control channel decoding.

It may therefore be possible to increase the battery life of a UE device by dynamically configuring the receiver front-end current consumption. In other words, by dynamically adjusting for different currents conducted in the RX front-end circuitry during various different operations/conditions, power consumption in the RX front-end circuitry may be reduced and the battery life of the wireless communication device may be increased/extended.

The power consumption in the RX front-end circuitry may be adapted through adjusting the linearity performance and power consumption (i.e. the conducted current) of the RX front-end circuitry (AFE) according to multiple modes of operation. Consequently, in one set of embodiments, the wireless communication device may switch between multiple modes of operation in order to optimize power consumption in the RX front-end circuitry:

Low-Power Mode (LPM) operation may be used during Initialization, Synchronization (PSS, SSS), and PBCH/PDCCH reception. In this mode the UE operates at high sensitivity and low linearity (as there is no TX leakage).

Lower-Power Mode (LerPM) operation may be used during Burst mode, i.e. while monitoring the PDCCH when DL activity is low or the SNR is high. In this mode the UE operates at low sensitivity and low linearity (again, because there is no TX leakage).

High-Performance Mode (HPM) of operation may be used for PDSCH reception during which TX leakage is typically present. That is, the HPM of operation is suited for decoding data on the PDSCH following PDCCH reception. In this mode the UE operates at high sensitivity and high linearity (because of the presence of TX leakage).

Ultra-Low-Power Mode (ULPM) operation may be used if there is no user data to decode on the PDSCH following PDCCH reception, and data reception is discontinuous. In this mode the RX front-end circuitry of the UE may be switched off entirely.

During LPM, LerPM and HPM modes of operation the receiver front-end path is active, and LTE signaling may be decoded. On the other-hand, in ULPM mode of operation no signaling is received and only the LO (local oscillator circuitry) may remain active in the analog front-end in order to maintain the synchronization.

Linearity from Intermodulation Requirement in LTE

Figure 5:
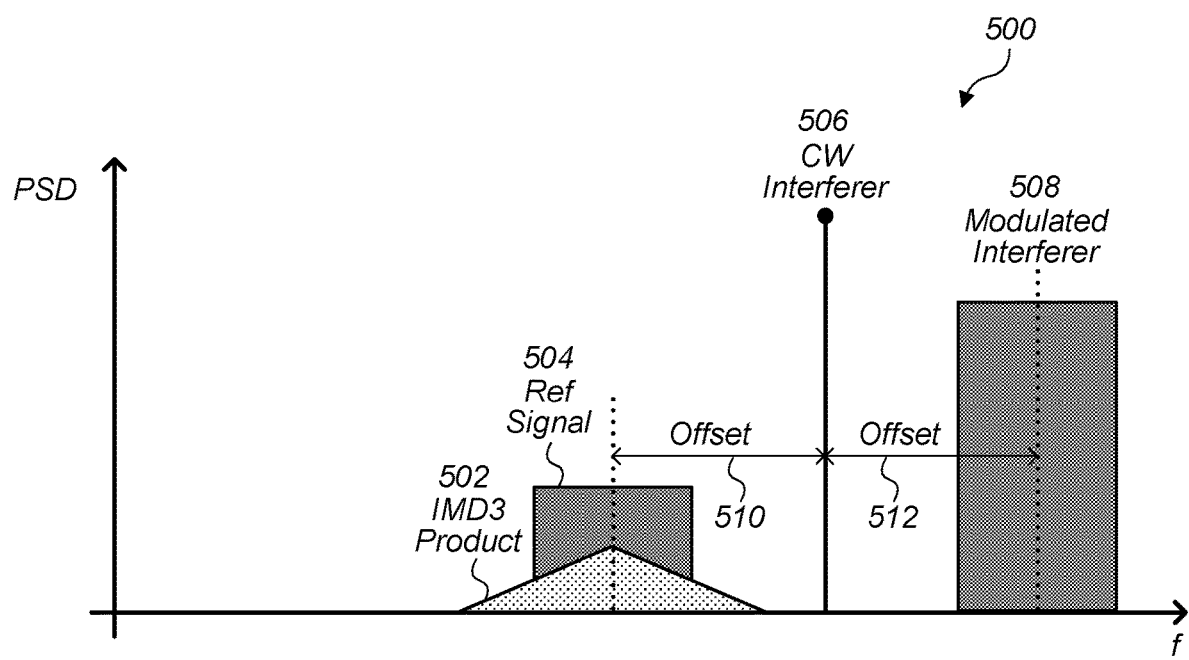
FIG. 5 shows an exemplary diagram illustrating the power spectral density (PSD) of various signals that may be present at a UE device during wireless communications defined by the standard via the intermodulation requirement in order to quantify the receiver linearity.

Intermodulation response rejection is a measure of the capability of the receiver to receive a wanted signal on its assigned channel frequency in the presence of two or more interfering signals which have a specific frequency relationship to the wanted signal. It is a metric that describes the linearity of the receiver's front end quantified by IP3 (3rd-order Intercept Point). The throughput is expected to be ≥95% of the maximum throughput of the reference measurement channels. Deriving the receiver linearity requirement for all the bands yields an IP3>−20 dBm. FIG. 5 shows an exemplary diagram 500 illustrating the power spectral density (PSD) of various signals that may be present at a UE device during wireless communications. The diagram of FIG. 5 illustrates the third-order intermodulation (IMD3) product 502 produced in the band of the reference signal 504 because of the presence of a continuous wave (CW) interfering signal (or interferer) 506 and a modulated interfering signal (or interferer) 508. As indicated in diagram 500, there is an offset 510 from the center (nominal) frequency of reference signal 504 to CW interfering signal 506, and an offset 512 from CW interfering signal 506 to the center frequency of modulated interfering signal 508.

TX Leakage Issue in FDD-LTE

Figure 6:
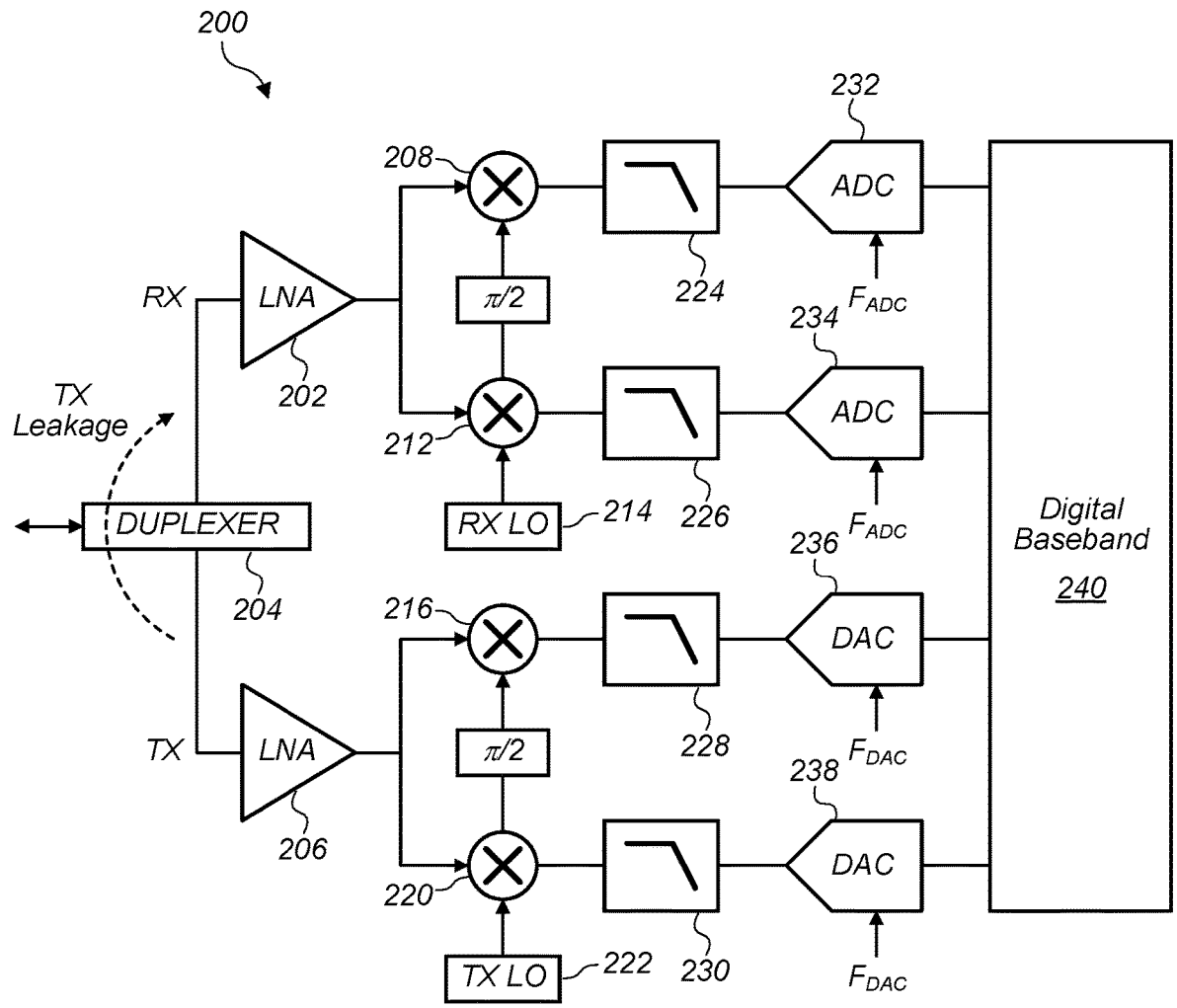
FIG. 6 shows a partial circuit diagram of an exemplary FDD transceiver path (TX path and RX path) and digital baseband circuitry of a UE device, according to some embodiments.

FIG. 6 shows a partial circuit diagram 200 of an exemplary transceiver path (TX path and RX path) and digital baseband circuitry of a UE device, according to some embodiments. The exemplary system includes low noise amplifiers 202 and 206, mixers 208, 212, 216 and 220, operating according to RX local oscillator 214 and TX local oscillator 222, respectively. The RX path and TX path further include respective low pass filters 224/226 and 228/230, respectively, and analog to digital converters (ADCs) 232/234 and 236/238, respectively. Baseband processing is performed by digital baseband processor 240.

Figure 7:
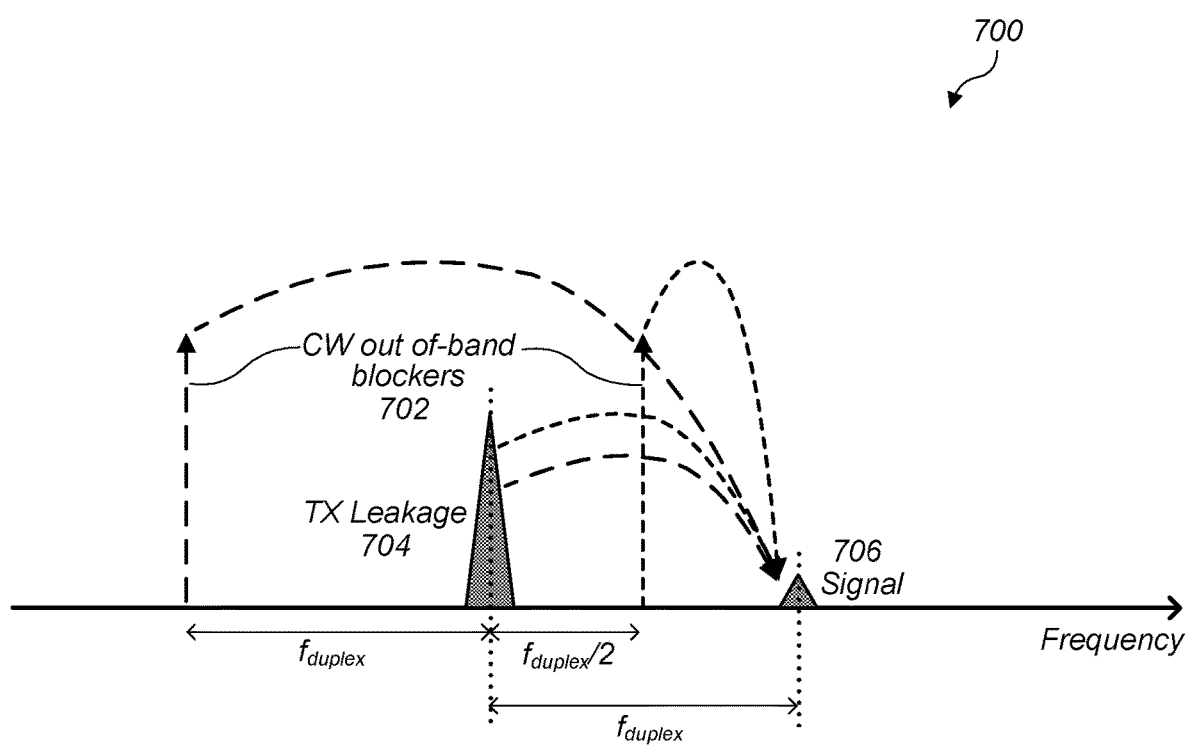
FIG. 7 shows an exemplary power spectral density diagram for a wanted signal which can be degraded by the receiver $3^{rd}$ order linearity due to TX leakage and CW out-of-band blockers.

In FDD-LTE, the receiver front-end linearity and dynamic range requirements are imposed by TX leakage through the duplexer 204. During reception of small signals, the presence of unwanted large signals nearby impact the linearity of the receiver. The direct impact on the transceiver design is the necessity to increase of the RX front-end power consumption (impacting battery life) in order to obtain a high dynamic range (DR) expressed in the equation:

$$DR = \frac{V_{IIP3}^2}{V_{ni}^2} = KI$$

representing a ratio between the linearity (IP3) and the sensitivity (Noise Figure) which is directly proportional to the current I, with K representative of a factor related to the transistor technology. While a high dynamic range allows for handling large blockers and at the same time receiving weak signals, the UE may burn a considerable amount of current in order to achieve high performance with the presence of TX leakage Linearity Constraints Due to TX Leakage Due to receiver nonlinearities ($2^{nd}$-order and $3^{rd}$-order), out-of-band blockers (or out-of-band blocker signals) intermodulate with the TX leakage signal, and the intermodulation (IMD) products, i.e. the signals resulting from the intermodulation can fall into a frequency range that overlaps with the frequency band of the wanted channel, potentially causing severe degradation if the linearity performance of the receiver does not meet at least certain required specifications. Specifically, the intermodulation due to CW (continuous wave) blocker[s] and TX leakage affects the receiver channel if blocker frequency is $$F_{TX}+f_{duplex}/2$$

$$F_{TX}-f_{duplex}$$

as illustrated in FIG. 7, which shows an exemplary power spectral density diagram 700 for the wanted signal 706, TX leakage blocker 704 and CW out-of-band blockers 702. In the equations above, $f_{duplex}$ is representative of the frequency separation between TX and RX bands in FDD mode. The TX leakage can impose a requirement of IP3>5 dBm (depending on the duplex) on the receiver, which is more difficult to achieve than the IP3 requirement derived from the intermodulation test around 25 dB, and which directly impacts the power consumption of the receiver (i.e. the power consumption in the RX front-end circuitry).

LTE Frame Reception Background

Figure 8:
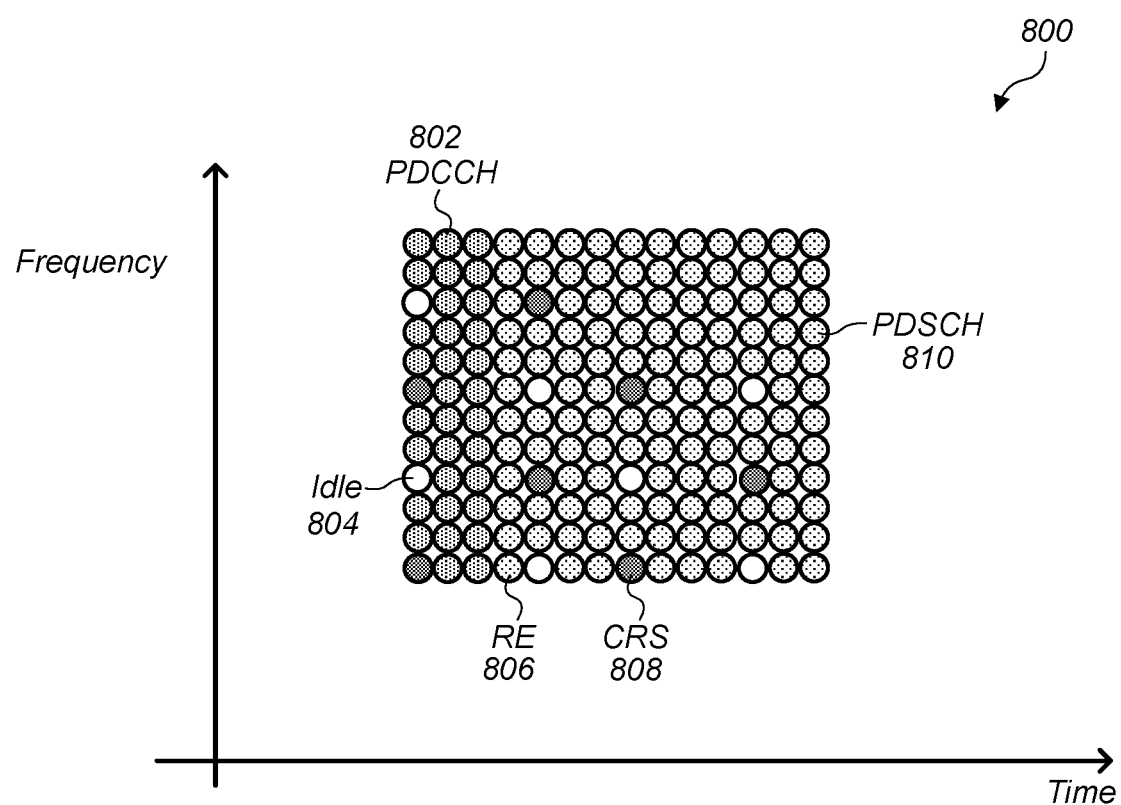
FIG. 8 shows a diagram illustrating an exemplary allocation of OFDM symbols to the various channels and signals.

In LTE, after a UE device switches ON, the RX front-end circuitry first synchronizes with the base station (eNB) in time and frequency in order to be able to decode the PBCH (Physical Broadcast Channel) carrying network information through MBI (Master Block Information) sent every 40 ms. Afterwards, the receiver (UE device) decodes the PDCCH (Physical Downlink Control Channel) which carries Downlink Control Information (DCI), which includes resource assignments and other control information for a UE device or a group of UE devices. The PDCCH is typically transmitted every subframe (1 ms). In RRC-Connected (Radio Resource Control Connected) mode a UE decodes the PDCCH in every subframe to determine if there is a grant scheduled. FIG. 8 shows a diagram 800 illustrating an exemplary allocation of OFDM symbols to the various channels and signals. The PDCCH 802 occupies the first OFDM symbols of a subframe and the number of PDCCH symbols is indicated through PCFICH and varies from 1 to 4. The PDSCH 810 (which carries the user data) occupies the remaining OFDM symbols of a subframe. For low-order modulation, low SNR (signal to noise ratio) is sufficient to decode the PDCCH. Resource elements 806 and CRS 808, as well as Idle cycles 804 are allocated as shown. Each type of allocation is represented by different shading in diagram 800.

LTE Burst Data

Figure 9:
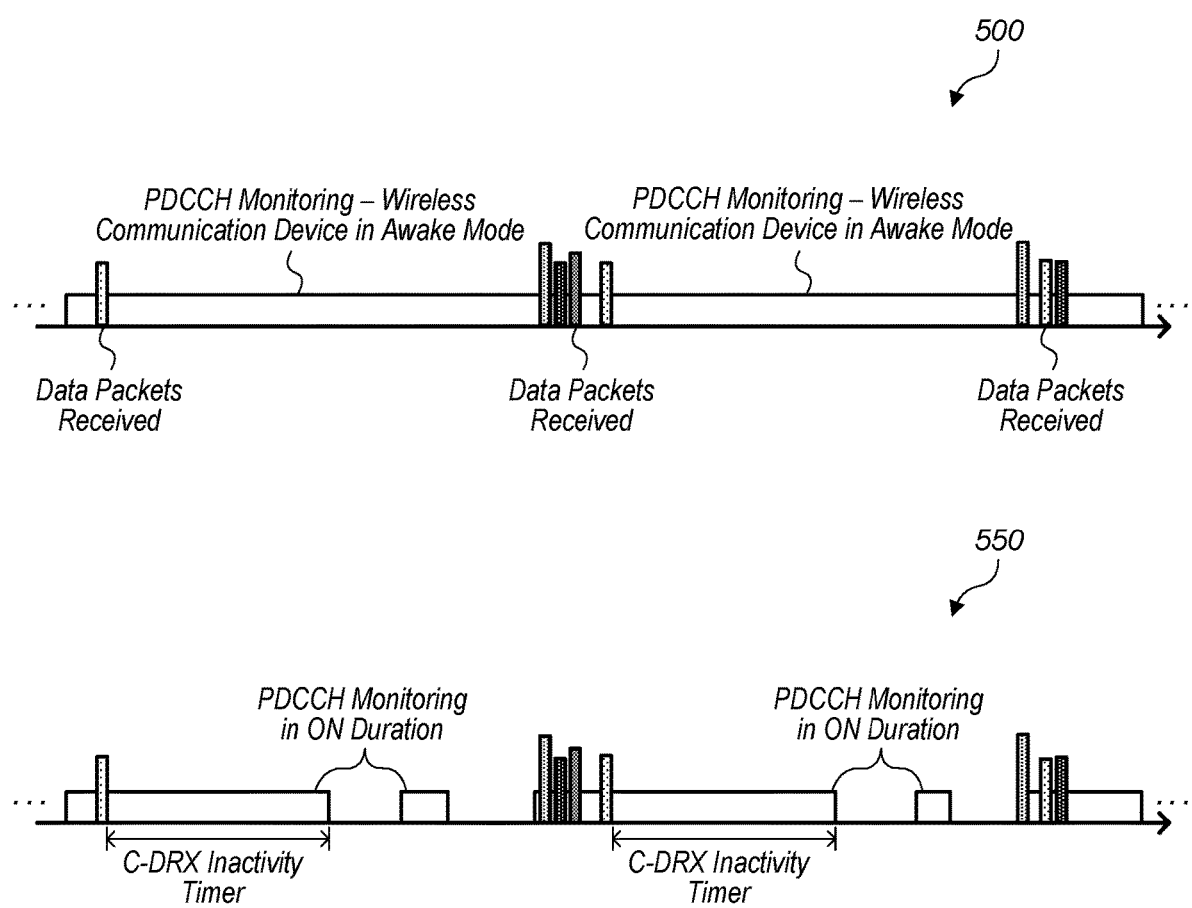
FIG. 9 shows respective exemplary timelines illustrating physical channel activity when C-DRX is not enabled and when C-DRX is enabled.

Data transmissions in LTE are often performed in bursts. As a result, there may be periods of time when DL data occupies multiple successive subframes, followed by periods of time when no DL activity is taking place. During these inactive periods of time the UE still monitors the PDCCH for a potential grant (as set forth in the 3GPP specification), but may operate to relax the sensitivity of its receiver (its RX front-end circuitry) in order to save power, based on certain metrics (as will be further detailed below) due to the fact that during these inactive periods the UE is unlikely to receive any PDCCH grant signals. This in turn allows the UE to save power. FIG. 9 shows respective exemplary timelines 500 and 550 illustrating physical channel activity when Connected-Mode Discontinuous Reception (C-DRX) is not enabled (500) and when C-DRX is enabled (550). With C-DRX enabled the RX front-end circuitry cannot be switched off. However, when C-DRX is not enabled, that is, reception is discontinuous, the receiver (RX front-end circuitry) may be switched off when no data is received, and may be reactivated when the scheduler informs the UE that data is being transmitted.

UE Initial Acquisition

Figure 10:
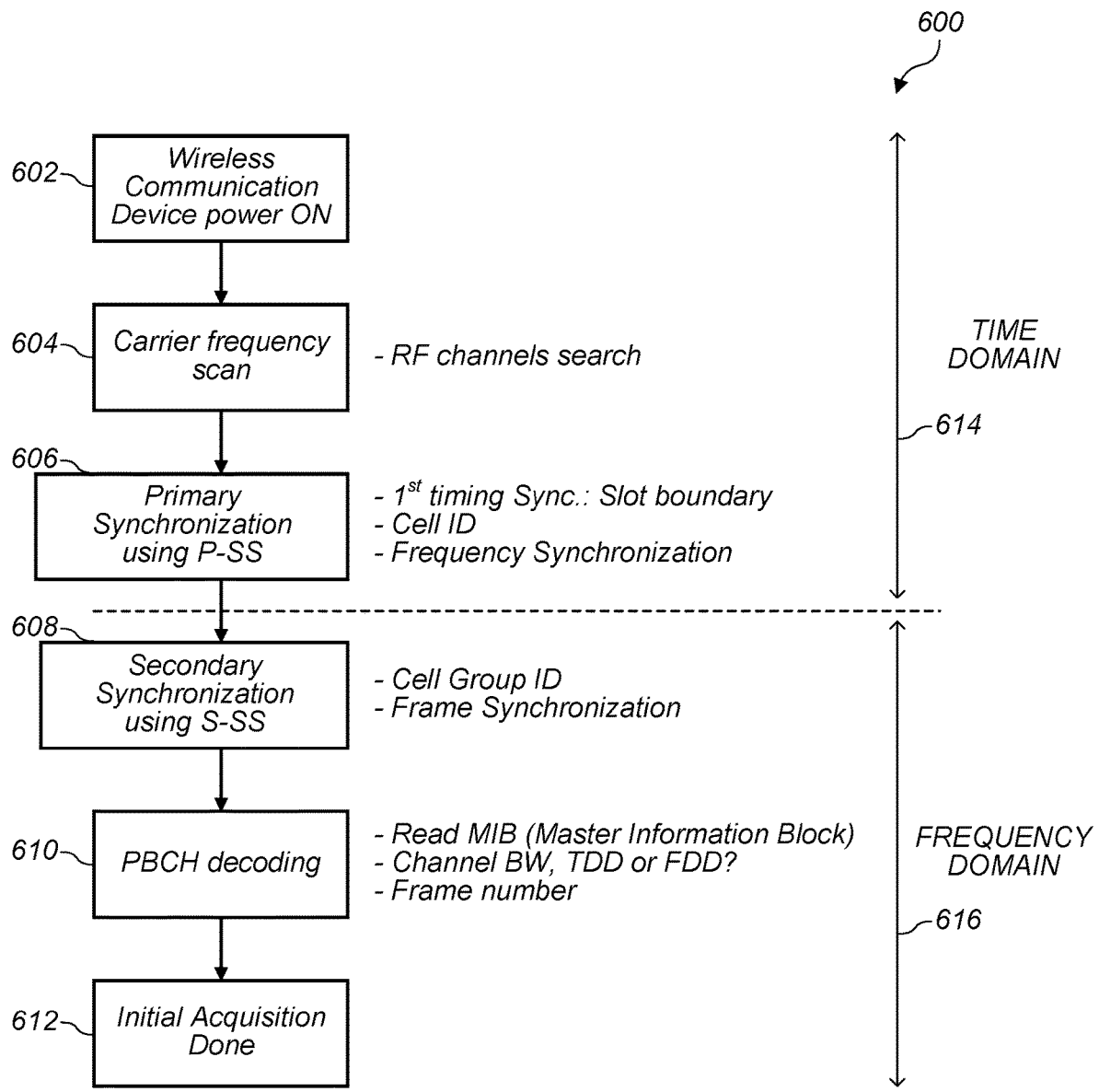
FIG. 10 shows an exemplary flow diagram illustrating the initial cell acquisition procedure for a UE device.

FIG. 10 shows an exemplary flow diagram illustrating the initial cell acquisition procedure for a UE device. 602, 604 and 606 represent time domain (614) synchronization operations while 608, 610, and 612 represent frequency domain (616) synchronization operations. After the UE switches ON (602), it seeks for the carrier frequency (604), synchronizes with the eNB (606 and 608), and decodes the MIB (Master Information Block) in the Physical Broadcast Channel (PBCH) to acquire the ability to exchange data (610). Upon completion of the PBCH decode, the initial acquisition is complete (612). During the initial acquisition phase there are no data transmissions from the UE.

Scheduling Low Power and High Performance Modes of Operation

Figure 11:
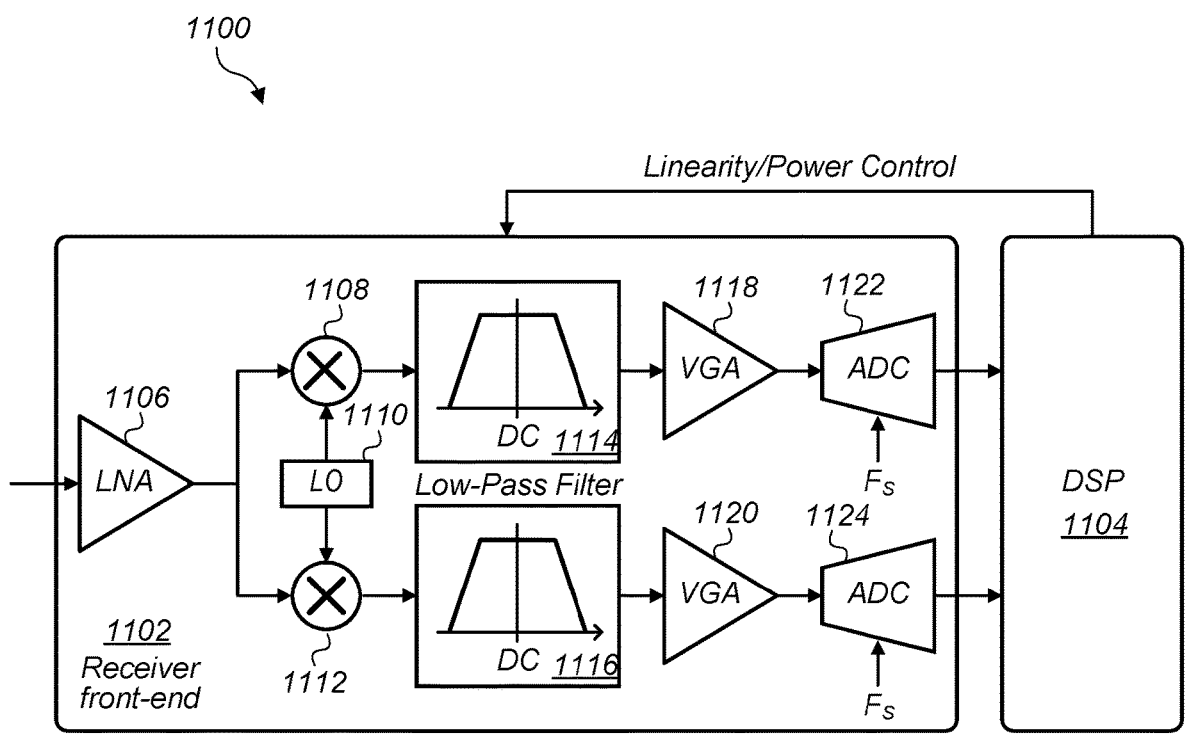
FIG. 11 shows a partial circuit diagram of an exemplary RX front-end circuitry and associated digital signal processing (DSP) circuitry controlling the RF front-end linearity and power.

FIG. 11 shows a partial circuit diagram 1100 of an exemplary RX front-end circuitry 1102 and associated digital signal processing (DSP) circuitry 1104. In the exemplary circuit 1100 the RX front-end circuitry includes low noise amplifier 1106, mixers 1108 and 1112 operating according to local oscillator 1110, and further includes low pass filters 1114 and 1116, variable gain amplifiers (VGAs) 1118 and 1120, and corresponding ADCs 1122 and 1124 operating at sampling frequency $F_s$. In some embodiments, DSP 1104 may be operated to control linearity and current (and accordingly, power) in the RX front-end circuitry 1102 to operate in one of at least four different modes of operation as previously described.

Figure 12:
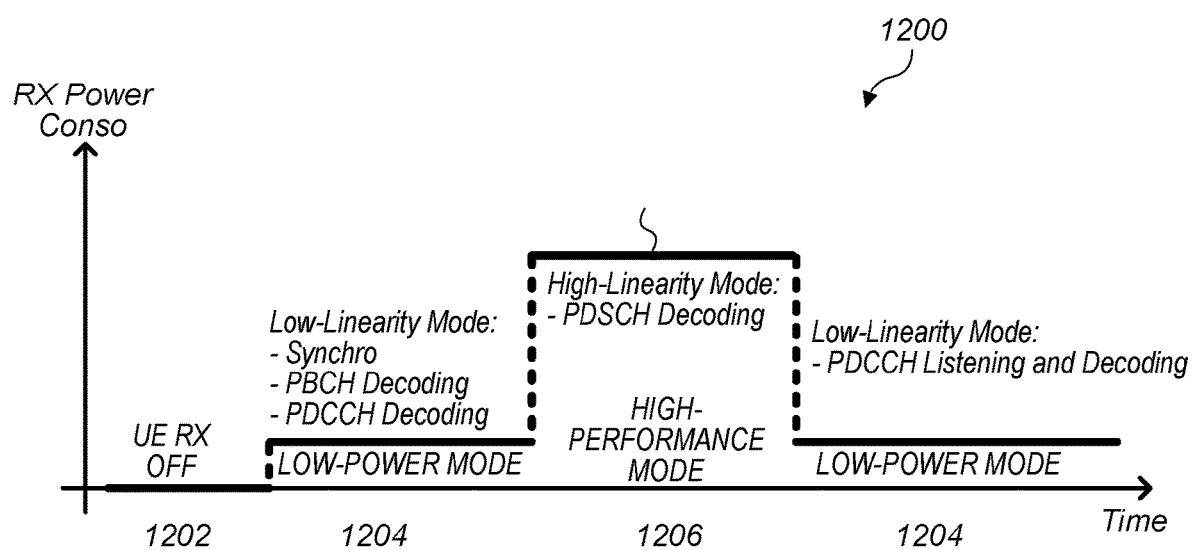
FIG. 12 shows a diagram illustrating the power consumption of the UE device while operating in two different modes of operation, according to some embodiments.

FIG. 12 shows a diagram 1200 illustrating the power consumption of the UE device while operating in two different modes of operation, according to some embodiments. Referring to FIG. 11, in the LPM of operation 1204 (which may be considered a low-linearity mode), the current may be reduced in the LNA (1106), mixer (1108 and 1110), low-pass filters (1114 and 1116), VGAs (1118 and 1120), and ADCs (1122 and 1124). That is, in effect the linearity, and then RX dynamic range may be relaxed as the signals to be decoded by the UE are robust, or only use QPSK modulation, and no TX leakage is present. In the HPM of operation 1206 (which may be considered a high-linearity mode of operation), the current may be increased in the LNA, mixer, low-pass filters, VGAs, and ADCs. That is, in effect the linearity is increased as PDSCH (user data) may use high order modulation (16/64-QAM) requiring high SNR, and the UE may be transmitting data at the same time, which may lead to the presence of TX leakage. The LO (Local Oscillator—1110) remains ON in order to maintain the RX time and frequency synchronizations (acquired during initial acquisition, as illustrated in the exemplary flow diagram shown in FIG. 10). As indicated in FIG. 12, an "Off mode" of operation (1202) includes the UE RX front end circuitry being turned off.

Switching from Low Power Mode to High Performance Mode

Figure 13:
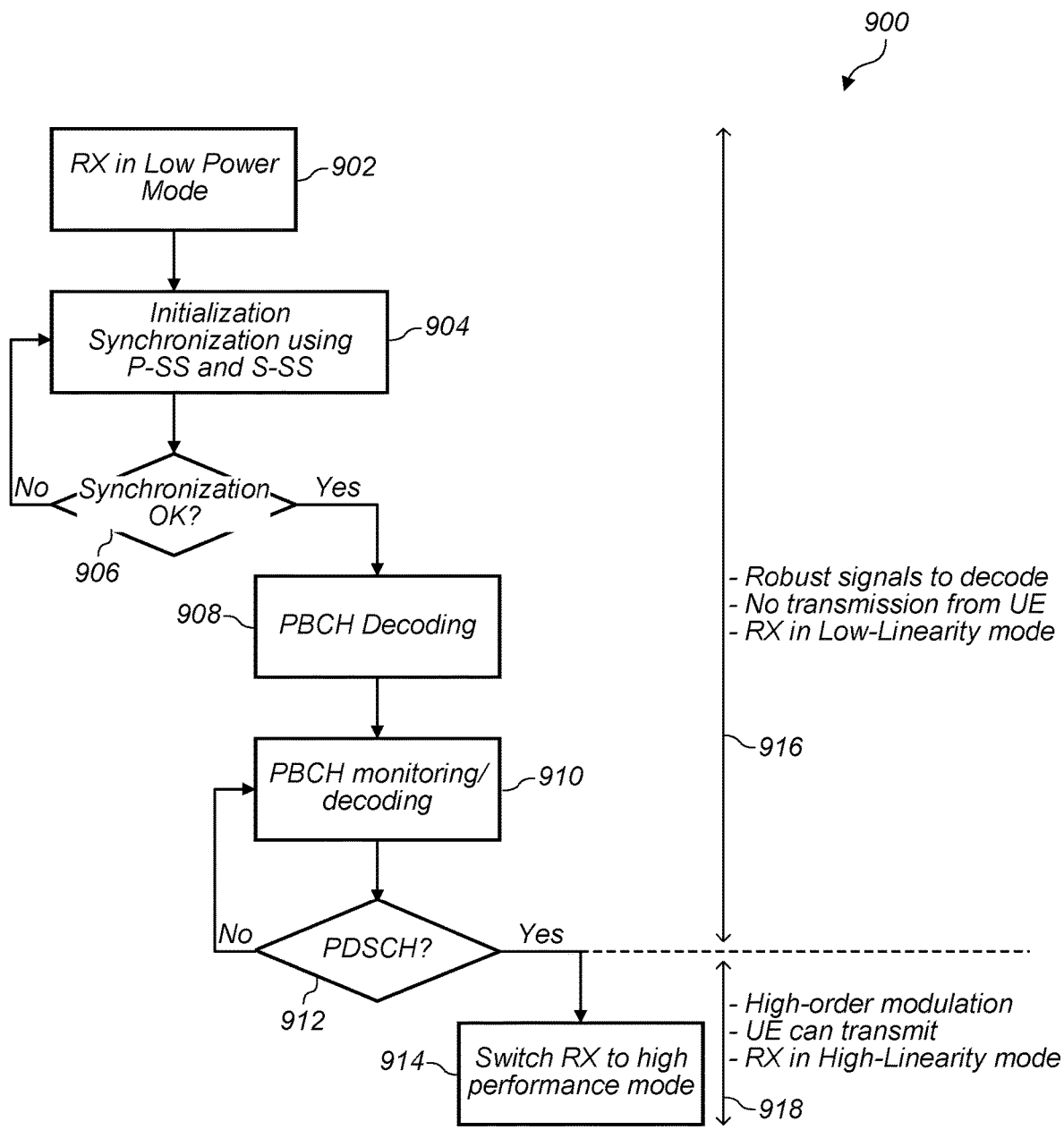
FIG. 13 shows a flow diagram illustrating a UE device switching from operating in a low-power mode to operating in a high-power mode, according to some embodiments.

FIG. 13 shows a flow diagram 900 illustrating a UE device switching from operating in an LPM 916 to operating in an HPM 918, according to some embodiments. In order to save the battery life of the UE, the RX front-end linearity may be relaxed and operated in low power mode 902 during UE initial acquisition and synchronization (904/906), and during PBCH/PDCCH decoding (908/910/912). Thus, the UE may operate in the LPM 916 because the P-SS (primary synchronization signal[s]) and S-SS (secondary synchronization signal[s]) are robust, PBCH and PDCCH use only QPSK which can be decoded with low SNR, and there is no TX leakage present. After decoding PDCCH, if the UE has to decode the PDSCH ("Yes" branch at 912)—the RX front-end circuitry may be switched (914) to operate in HPM 918 because the use of higher order modulation such as 16-QAM for 64-QAM requires better linearity and higher SNR. In addition, the UE may also transmit data during these operations, which may introduce TX leakage.

Lower-Power Mode: Low Sensitivity and Low Linearity

Figure 14:
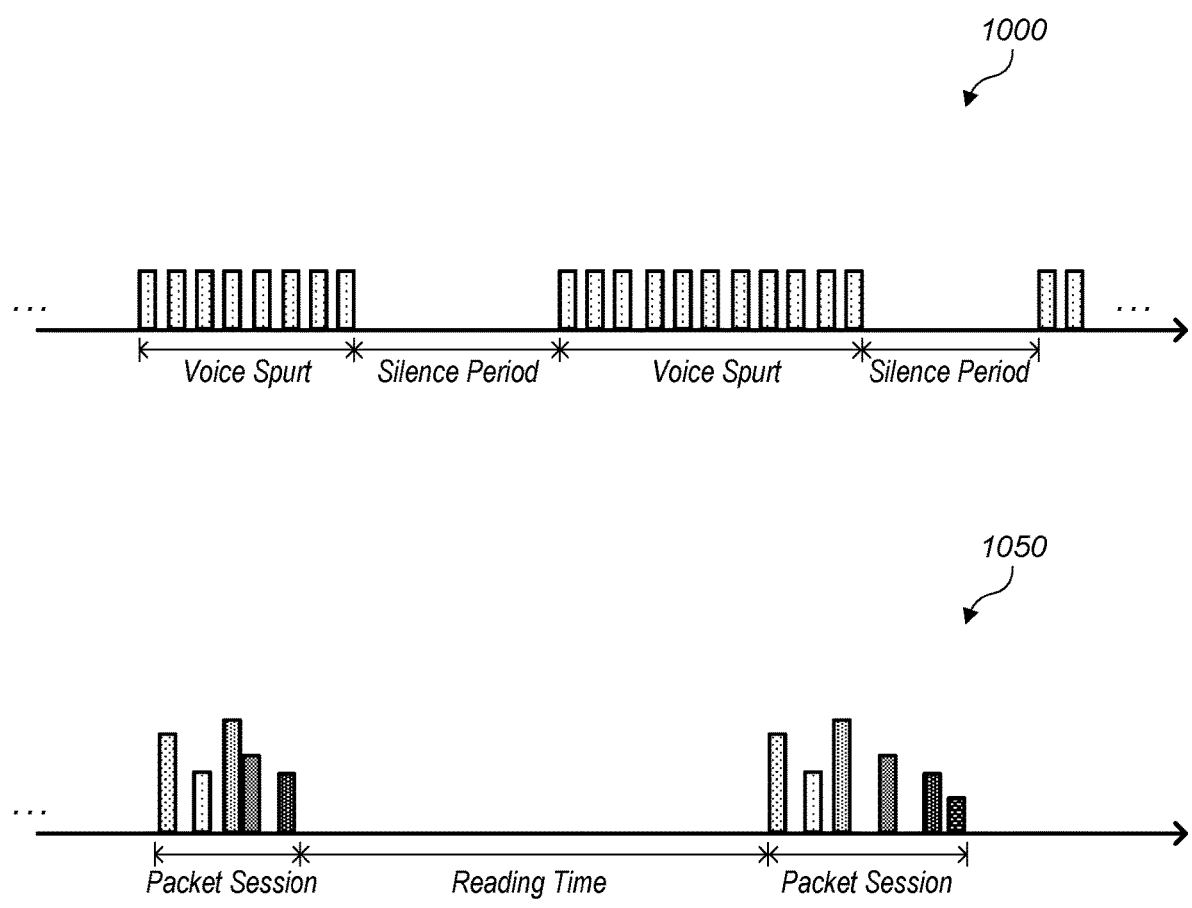
FIG. 14 shows diagrams illustrating packet transmission during voice traffic and during web browsing, respectively, according to some embodiments.

FIG. 14 shows exemplary diagrams illustrating packet transmission during different types of transmission. For example, diagram 1000 shows packet transmission during real-time data transmissions during which QoS may be sensitive, e.g. during voice traffic, and diagram 1050 shows packet transmission during non-real-time data transmissions during which QoS may not be sensitive, e.g. during web browsing. In order to enable the LPM, the UE may use the following metrics:

- Inactivity timer: monitor the duration for which no PDCCH grant has been received during DL. For example if after a specified time duration, e.g. after 20 ms, no PDCCH has been received, the UE may interpret the lack of PDCCH as a sign that the DL activity has ceased.
- SINR (Signal-To-Interference-Plus-Noise Ratio): in bad coverage (low SINR regime), the UE may require full sensitivity to be able to decode the PDCCH, hence the UE may relax the sensitivity only if SINR>SINR_th (i.e. the SINR value is over a specified threshold).
- Type of applications running on a device: if for example it is audio or video traffic, then the traffic is more regular and periodic, and the UE needs to be ready to decode PDCCH. However if it is browsing, then the traffic is more bursty.
- Data rate: for low data rates, relaxing the sensitivity might increase the time for DL but will not impact the user experience as if it was for a high data rate application.

Switching from High Performance Mode to Low Power Mode and to Lower Power Mode

Figure 15:
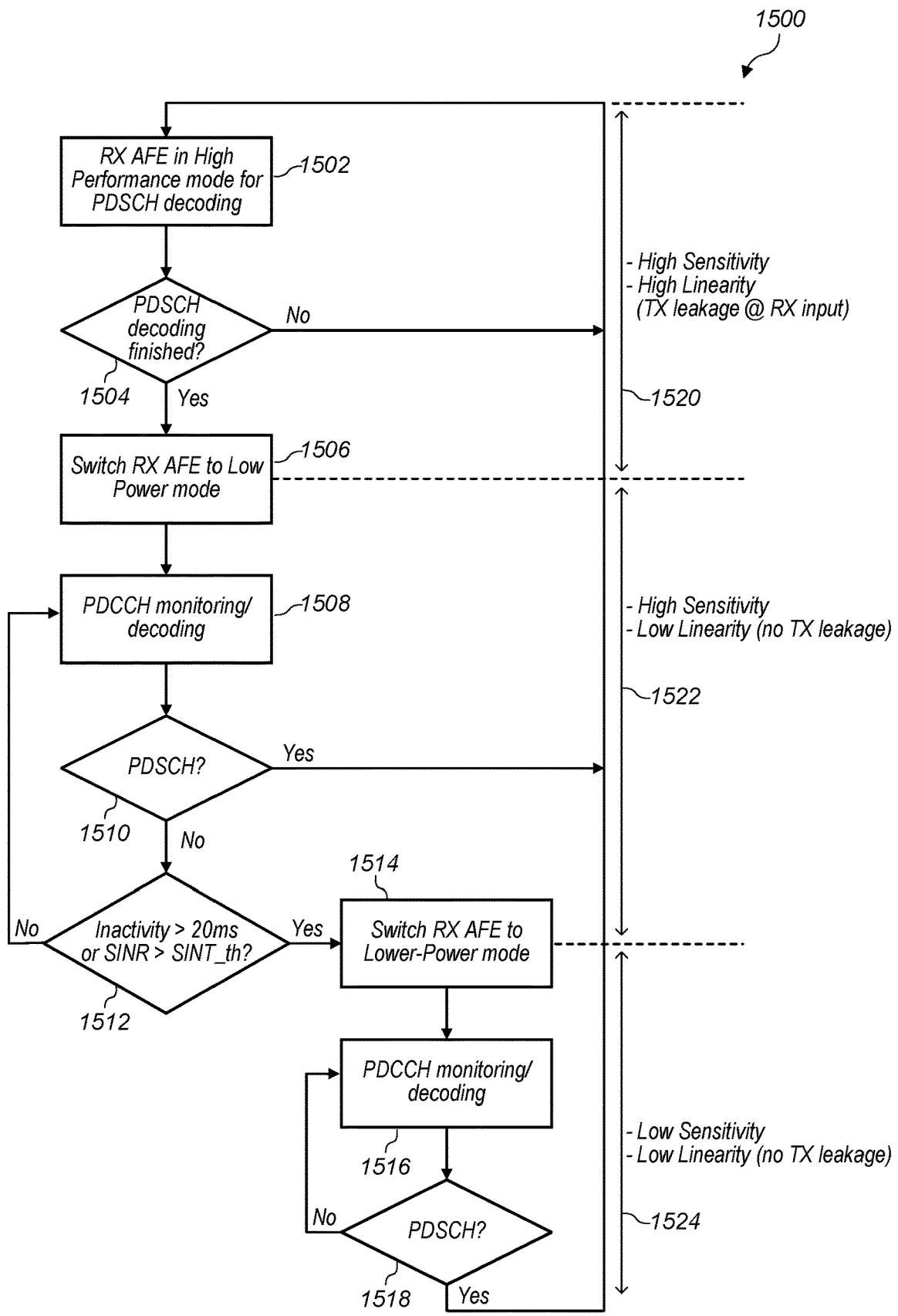
FIG. 15 shows a flow diagram illustrating a UE device switching from operating in a high-power mode to operating in low-power mode, then switching to operating in a lower-power mode, according to some embodiments.

FIG. 15 shows an exemplary flow diagram 1500 illustrating a UE device switching from operating in an HPM 1520 to operating in an LPM 1522, then switching to operating in a LerPM, 1524 according to some embodiments. The RX front-end circuitry (RX AFE) of the UE device may be operating in the HPM 1520 for decoding the PDSCH (1502). Once the PDSCH decoding is complete ("Yes" branch taken at 1504), the UE may transition to operating the RX front-end circuitry in the LPM 1522 (1506). In LPM 1522, the UE may be monitoring and decoding the PDCCH (1508), and if data is not expected on the PDSCH ("No" branch taken at 1510), and the SINR is greater than a specified threshold value or an inactivity period exceeds a specified time duration ("Yes" branch taken at 1512), the UE may switch the RX front-end circuitry to operate in the LerPM 1524 (1514). If data is not expected on the PDSCH ("No" branch taken at 1510), and the SINR is not greater than a specified threshold value or an inactivity period does not exceed a specified time duration ("No" branch taken at 1512), the UE may continue to monitor and decode the PDCCH (1508). In LerPM 1524 the UE may monitor and decode the PDCCH (1516), and may continue to do so while there is no data to decode on the PDSCH ("No" branch taken at 1518). If there is data to decode on the PDSCH ("Yes" branch taken at 1518) then the UE transitions back to operating in the HPM 1520 (1502).

Ultra-Low-Power Mode when there is No Data to Decode on PDSCH

In LPM the RX front-end path is active in order to receive PDCCH but uses a lower current in order to save battery life. After decoding PDCCH, if there is no PDSCH (no user data to decode) expected, the RX front-end path may be switched off to transition to ULPM. Referring back to FIG. 11, the LNA 1106, mixers 1108/1112, low-pass filters 1114/1116, VGAs 1118/1120, and ADCs 1122/1124 may be switched off, then switched back on for the subsequent PDDCH reception. The LO (Local Oscillator) 1110 may remain turned on for keeping the RX time/frequency synchronization.

Figure 16:
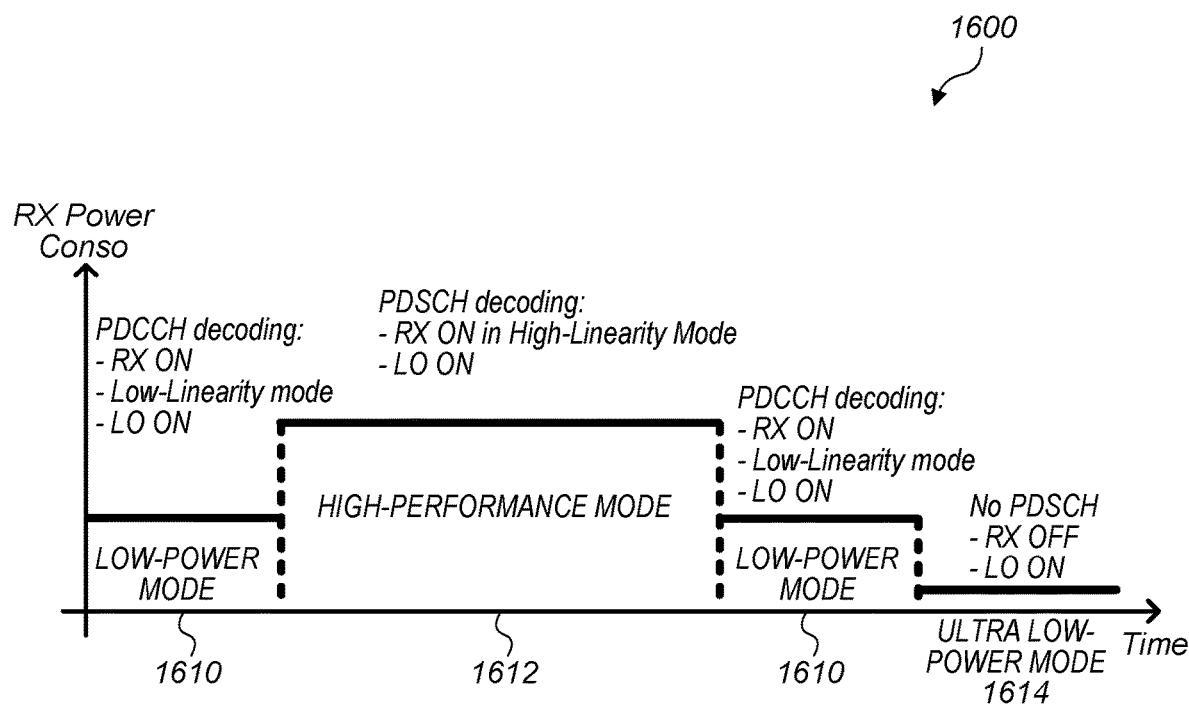
FIG. 16 shows a diagram illustrating the power consumption of the UE device when operating in three different power modes of operation, according to some embodiments.

FIG. 16 shows an exemplary diagram illustrating the power consumption of the UE device when operating in three different modes of operation, according to some embodiments. In a low power mode 1610 PDCCH is decoded with the RX front end circuit and LO turned on, operating in low linearity mode. In a high performance mode 1612 PDSCH is decoded with the RX front end circuit and LO turned on, operating in high linearity mode. In an ultra-low power mode, the RX front end circuitry is turned off as no PDSCH decoding is taking place, while the LO remains turned on.

Figure 17:
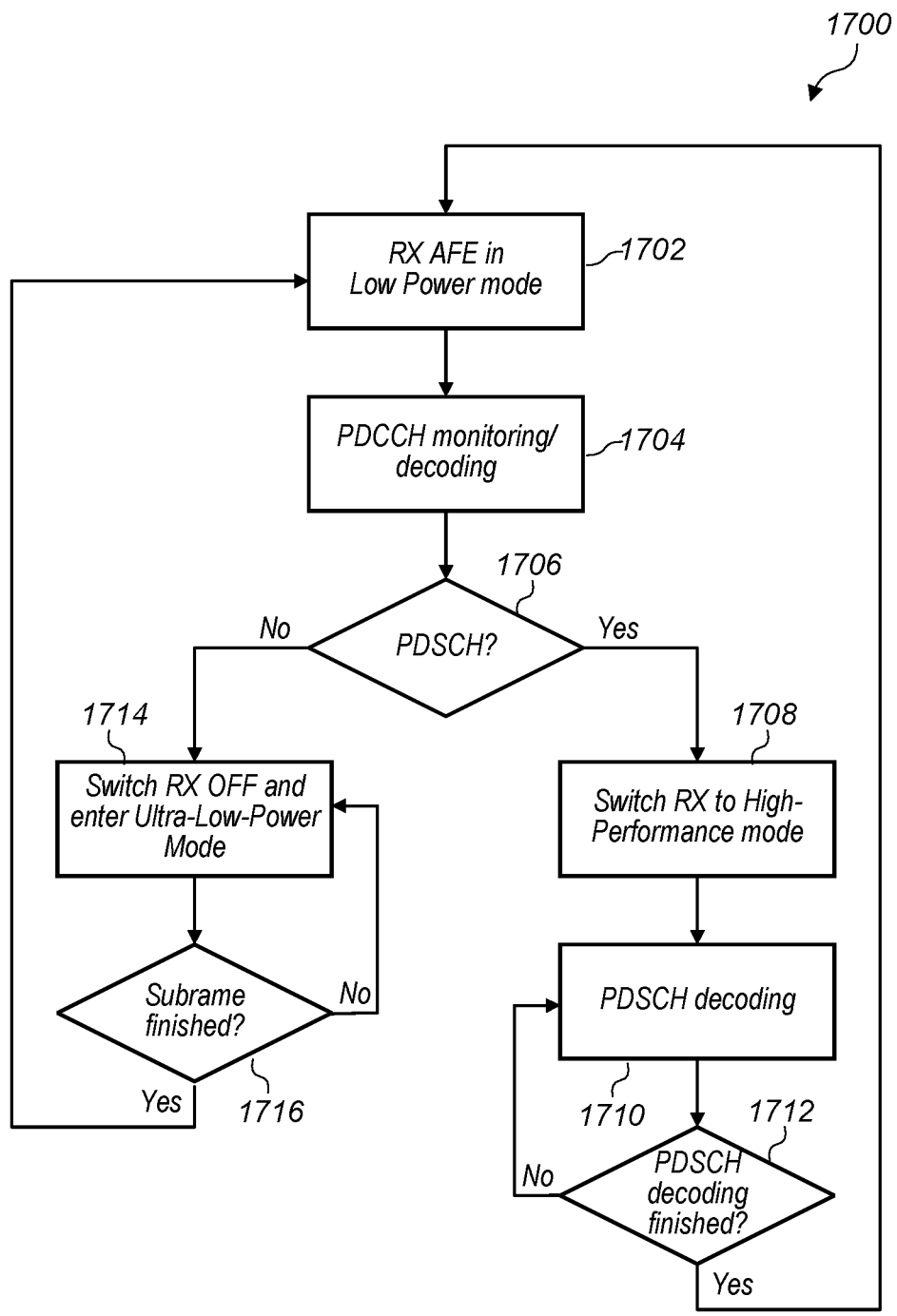
FIG. 17 shows a flow diagram of a UE device switching between different power modes of operation, according to some embodiments.

FIG. 17 shows an exemplary flow diagram 1700 of a UE device switching between different power modes of operation, according to some embodiments. The UE may operate its RX front-end circuitry (RX AFE) in LPM (1702), and perform monitoring and decoding of the PDCCH (1704). If user data is present on the PDSCH ("Yes" branch taken at 1706), the UE may transition to operate the RX front-end circuitry in HPM (1708), decode the PDSCH (1710) and transition back to operating the RX front-end circuitry in LPM once PDSCH decoding is complete ("Yes" branch taken at 1712). If, after 1704 the indication is that there is no user data present ("No" branch taken at 1706), the UE may switch off the RX front-end circuitry (with the exception of the local oscillator) and enter ULPM (1714) where it may remain until the subframe is finished ("Yes" branch taken at 1716), at which point in time the UE may transition back to operating the RX front-end circuitry in the LPM (1702) to monitor and decode the PDCCH (1704), since PDCCH is monitored for each subframe. The ULPM is especially beneficial in saving power during continuous mode of reception.

Wireless Communication Device Operation

Figure 18:
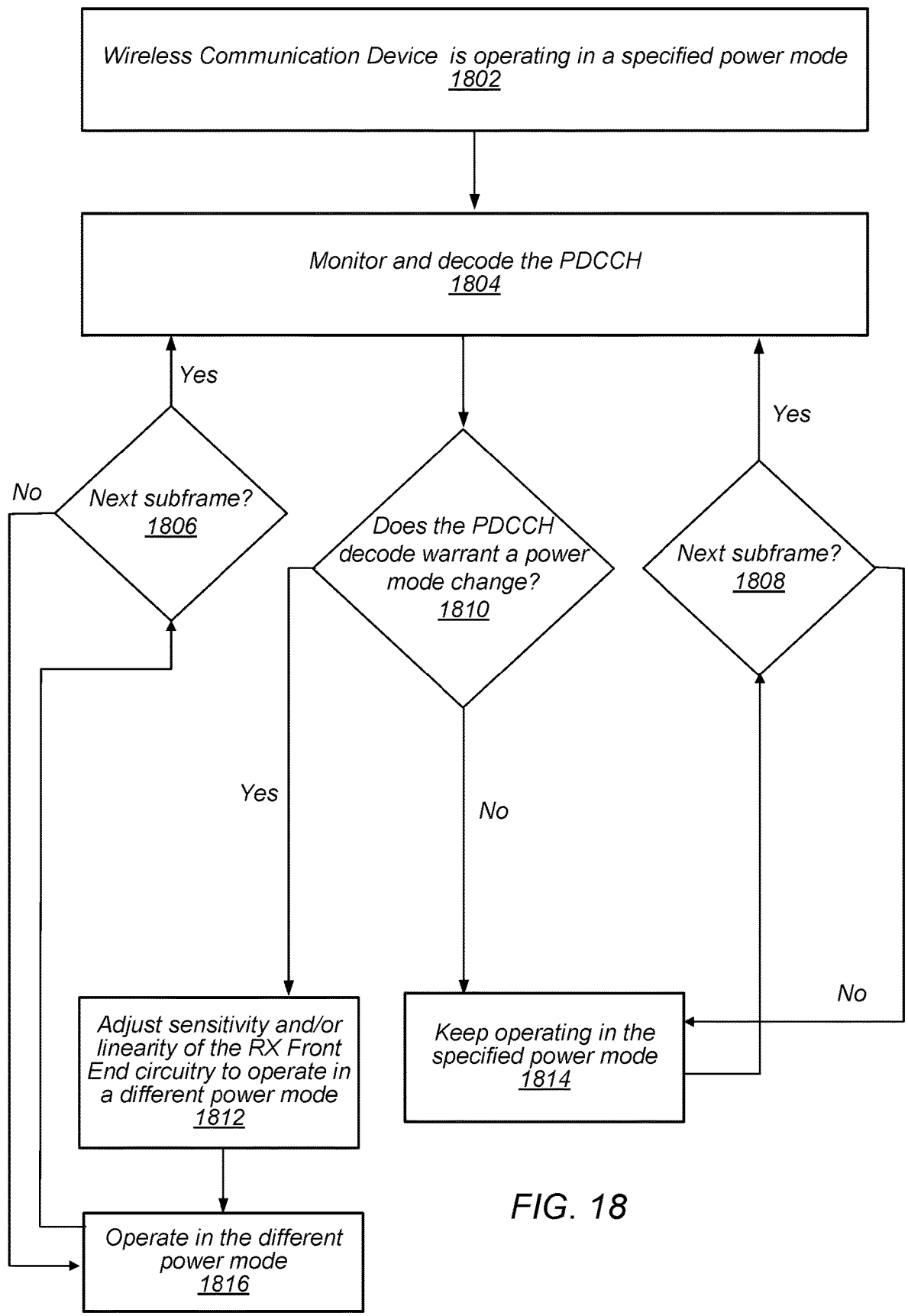
FIG. 18 shows a flow diagram illustrating operation of a UE device according to some embodiments.

FIG. 18 shows an exemplary flow diagram illustrating operation of a wireless communication device (UE device) according to some embodiments. The UE may switch between operating in different power modes based at least on PDCCH decoding. That is, the UE may operate (its RX front-end circuitry) in any one of a number of different power modes, and may switch to operating the RX front-end circuitry in a different power mode based at least on PDCCH decoding. Consequently, TX leakage does not need to be monitored, and the UE may adjust/adapt the sensitivity and linearity of its RX front-end circuitry to reduce power consumption. Thus, the UE may be operating in a specified power mode, which may be one of many different possible power modes of operation (1802). Once the UE has performed an initial acquisition, it may monitor and decode the PDCCH (1804). If results of the PDCCH decode warrant a power mode change ("Yes" branch taken at 1810), the UE may adjust the sensitivity and/or linearity of the RX Front End circuitry to operate in a different power mode (1812), and operate in that power mode (1816). If results of the PDCCH decode do not warrant a power mode change ("No" branch taken at 1810), the UE may keep operating in the present (specified) power mode (1814). Upon the next subframe (1806 for 1816 and 1808 for 1814), the UE may again decode PDCCH (1804).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
 a processing element configured to cause a wireless communication device to:
  operate in one of a plurality of different power modes, wherein each power mode of the plurality of different power modes corresponds to a different combination of sensitivity level and linearity level of a receiver (RX) front-end circuitry of the wireless communication device;
  determine whether to switch from operating in a first power mode of the plurality of power modes to operating in a second power mode or a third power mode of the plurality of power modes, based at least on a decoding of a physical control channel by the wireless communication device;
  switch from operating in the first power mode to operating in the second power mode based on the decoding of the physical control channel indicating that the wireless communication device is expected to decode a physical data channel; and
  switch from operating in the first power mode to operating in the third power mode based on:
   the decoding of the physical control channel indicating that the wireless communication device is not expected to decode the physical data channel; and
   one or more metrics.

2. The apparatus of claim 1, wherein the first power mode corresponds to the RX front-end circuitry operating at a higher sensitivity level relative to the third power mode and a lower linearity level relative to the second power mode;
 wherein the third power mode corresponds to the RX front-end circuitry operating at a lower sensitivity level relative to the first power mode and second power mode and a lower linearity level relative to the second power mode; and
 wherein the second power mode corresponds to the RX front-end circuitry operating at a higher sensitivity level relative to the third power mode and a higher linearity level relative to the first power mode and third power mode.

3. The apparatus of claim 1, wherein the processing element is configured to cause the wireless communication device to switch from operating in one of the plurality of power modes to operating in another of the plurality of power modes by causing the wireless communication device to adjust a current conducted by the RX front-end circuitry of the wireless communication device.

4. The apparatus of claim 1, wherein the processing element is further configured to cause the wireless communication device to switch from operating in the second power mode to operating in the first power mode once decoding of the physical data channel is complete.

5. The apparatus of claim 1, wherein the one or more metrics comprise one or more of the following:
 a time duration for which no grant signal has been received by the wireless communication device in downlink communications;
 signal-to-interference-plus-noise ratio at the wireless communication device;
 type of applications running on the wireless communication device; or
 data rate of data received by the wireless communication device.

6. The apparatus of claim 1, wherein the first power mode corresponds to the RX front-end circuitry operating at a higher sensitivity level relative to the third power mode and a lower linearity level relative to the second power mode, wherein the processing element is configured to cause the wireless communication device to perform one or more of the following while operating in the first power mode:
 carrier frequency scan;
 frequency synchronization;
 frame synchronization;
 physical broadcast channel decoding; or
 physical downlink control channel monitoring and decoding.

7. The apparatus of claim 1, wherein the third power mode corresponds to the RX front-end circuitry operating at a lower sensitivity level relative to the first power mode and second power mode and a lower linearity level relative to the second power mode, wherein the processing element is configured to cause the wireless communication device to perform one or more of the following while operating in the third power mode:

physical downlink control channel monitoring and decoding when downlink activity is low; or physical downlink control channel monitoring and decoding when signal-to-noise ratio is high.

8. The apparatus of claim 1, wherein the second power mode corresponds to the RX front-end circuitry operating at a higher sensitivity level relative to the third power mode and a higher linearity level relative to the first power mode and third power mode, wherein the processing element is configured to cause the wireless communication device to decode user data received on a physical downlink shared channel while operating in the second power mode.

9. The apparatus of claim 1, wherein the plurality of power modes comprise an ultra-low-power mode corresponding to the RX front-end circuitry being turned off, wherein the processing element is configured to cause the wireless communication device to turn off the RX front-end circuitry and leave a local oscillator turned on while operating in the ultra-low-power mode.

10. A non-transitory memory element storing programming instructions executable by a processing element to cause a wireless communication device to:
operate in one of a plurality of different power modes, wherein each power mode of the plurality of different power modes corresponds to a different combination of sensitivity level and linearity level of a receiver (RX) front-end circuitry of the wireless communication device;
determine whether to switch from operating in a first power mode of the plurality of power modes to operating in a second power mode or a third power mode of the plurality of power modes, based at least on a decoding of a physical control channel by the wireless communication device;
switch from operating in the first power mode to operating in the second power mode based on the decoding of the physical control channel indicating that the wireless communication device is expected to decode a corresponding physical data channel; and
switch from operating in the first power mode to operating in the third power mode based on:
the decoding of the physical control channel indicating that the wireless communication device is not expected to decode the physical data channel; and
one or more metrics.

11. The non-transitory memory element of claim 10, wherein each different combination of sensitivity level and linearity level corresponds to a different one of:
the RX front-end circuitry operating at a high sensitivity level within a first sensitivity range and a low linearity level within a first linearity range;
the RX front-end circuitry operating at a low sensitivity level within a second sensitivity range and a low linearity level within the first linearity range;
the RX front-end circuitry operating at a high sensitivity level within the first sensitivity range and a high linearity level within a second linearity range; or
the RX front-end circuitry being turned off;
wherein the first sensitivity range comprises sensitivity levels higher than sensitivity levels comprised in the second sensitivity range, and wherein the first linearity range comprises linearity levels lower than linearity levels comprised in the second linearity range.

12. The non-transitory memory element of claim 10, wherein the programming instructions are executable by the processing element to cause the wireless communication device to switch from operating in one of the plurality of power modes to operating in another of the plurality of power modes by causing the wireless communication device to adjust a current conducted by the RX front-end circuitry of the wireless communication device.

13. The non-transitory memory element of claim 10, wherein the one or more metrics comprise one or more of the following:
a time duration for which no grant signal has been received by the wireless communication device in downlink communications;
signal-to-interference-plus-noise ratio at the wireless communication device;
type of applications running on the wireless communication device; or
data rate of data received by the wireless communication device.

14. The non-transitory memory element of claim 10, wherein the first power mode corresponds to the RX front-end circuitry operating at a higher sensitivity level relative to the third power mode and a lower linearity level relative to the second power mode, wherein the programming instructions are executable by the processing element to further cause the wireless communication device to perform one or more of the following while operating in the first power mode:
carrier frequency scan;
frequency synchronization;
frame synchronization;
physical broadcast channel decoding; or
physical downlink control channel monitoring and decoding;
wherein the third power mode corresponds to the RX front-end circuitry operating at a lower sensitivity level relative to the first power mode and second power mode and a lower linearity level relative to the second power mode, wherein the programming instructions are executable by the processing element to further cause the wireless communication device to perform one or more of the following while operating in the third power mode:
physical downlink control channel monitoring and decoding when downlink activity is low; or
physical downlink control channel monitoring and decoding when signal-to-noise ratio is high; and
wherein the second power mode corresponds to the RX front-end circuitry operating at a higher sensitivity level relative to the third power mode and a higher linearity level relative to the first power mode and third power mode, wherein the programming instructions are executable by the processing element to further cause the wireless communication device to decode user data received on a physical downlink shared channel while operating in the second power mode.

15. A wireless communication device comprising:
radio circuitry comprising one or more antennas and configured to facilitate wireless radio frequency communications of the wireless communication device; and
a processing element configured to interoperate with the radio circuitry to cause the wireless communication device to:
operate in one of a plurality of different power modes, wherein each power mode of the plurality of different power modes corresponds to a different combination of sensitivity level and linearity level of a receiver (RX) front-end circuitry of the wireless communication device;

determine whether to switch from operating in a first power mode of the plurality of power modes to operating in a second power mode or a third power mode of the plurality of power modes, based at least on a decoding of a physical control channel by the wireless communication device;

switch from operating in the first power mode to operating in the second power mode based on the decoding of the physical control channel indicating that the wireless communication device is expected to decode a corresponding physical data channel; and switch from operating in the first power mode to operating in the third power mode based on:
  the decoding of the physical control channel indicating that the wireless communication device is not expected to decode the physical data channel; and
  one or more metrics.

16. The wireless communication device of claim 15, wherein each different combination of sensitivity level and linearity level corresponds to a different one of:
  the RX front-end circuitry operating at a high sensitivity level within a first sensitivity range and a low linearity level within a first linearity range;
  the RX front-end circuitry operating at a low sensitivity level within a second sensitivity range and a low linearity level within the first linearity range;
  the RX front-end circuitry operating at a high sensitivity level within the first sensitivity range and a high linearity level within a second linearity range; or
  the RX front-end circuitry being turned off;
  wherein the first sensitivity range comprises sensitivity levels higher than sensitivity levels comprised in the second sensitivity range, and wherein the first linearity range comprises linearity levels lower than linearity levels comprised in the second linearity range.

17. The wireless communication device of claim 15, wherein the processing element is configured to interoperate with the radio circuitry to further cause the wireless communication device to switch from operating in one of the plurality of power modes to operating in another of the plurality of power modes by causing the wireless communication device to adjust a current conducted by the RX front-end circuitry of the wireless communication device.

18. The wireless communication device of claim 15, wherein the processing element is configured to interoperate with the radio circuitry to further cause the wireless communication device to switch from operating in the second power mode to operating in the first power mode once decoding of the physical data channel is complete.

19. The wireless communication device of claim 15, wherein the one or more metrics comprise one or more of the following:
  a time duration for which no grant signal has been received by the wireless communication device in downlink communications;
  signal-to-interference-plus-noise ratio at the wireless communication device;
  type of applications running on the wireless communication device; or
  data rate of data received by the wireless communication device.

20. The wireless communication device of claim 15, wherein the first power mode corresponds to the RX front-end circuitry operating at a higher sensitivity level relative to the third power mode and a lower linearity level relative to the second power mode, wherein the programming instructions are executable by the processing element to further cause the wireless communication device to perform one or more of the following while operating in the first power mode:
  carrier frequency scan;
  frequency synchronization;
  frame synchronization;
  physical broadcast channel decoding; or
  physical downlink control channel monitoring and decoding;
  wherein the third power mode corresponds to the RX front-end circuitry operating at a lower sensitivity level relative to the first power mode and second power mode and a lower linearity level relative to the second power mode, wherein the programming instructions are executable by the processing element to further cause the wireless communication device to perform one or more of the following while operating in the third power mode:
  physical downlink control channel monitoring and decoding when downlink activity is low; or
  physical downlink control channel monitoring and decoding when signal-to-noise ratio is high; and
  wherein the second power mode corresponds to the RX front-end circuitry operating at a higher sensitivity level relative to the third power mode and a higher linearity level relative to the first power mode and third power mode, wherein the programming instructions are executable by the processing element to further cause the wireless communication device to decode user data received on a physical downlink shared channel while operating in the second power mode.

* * * * *